United States Patent [19]

Ryeczek

[11] Patent Number: 4,457,988
[45] Date of Patent: Jul. 3, 1984

[54] EARTH BATTERY

[76] Inventor: John J. Ryeczek, R.D. #1, Box 190C, Point Marion, Pa. 15474

[21] Appl. No.: 384,781

[22] Filed: Jun. 4, 1982

[51] Int. Cl.³ .......................................... H01M 14/00
[52] U.S. Cl. ................................ 429/47; 204/105 R; 175/64
[58] Field of Search ............................ 429/10, 47, 13

[56] References Cited

U.S. PATENT DOCUMENTS

| | | | |
|---|---|---|---|
| 155,209 | 9/1874 | Snow | 429/47 |
| 182,802 | 10/1896 | Cerpaux | 429/47 |
| 329,724 | 11/1885 | Dieckmann | 429/47 |
| 495,582 | 4/1893 | Emme | 429/47 |
| 728,381 | 5/1903 | Emme | 429/47 |
| 3,288,648 | 11/1966 | Jones | 429/13 |

Primary Examiner—Donald L. Walton
Attorney, Agent, or Firm—Webb, Burden, Robinson & Webb

[57] ABSTRACT

An earth battery which includes a first electrode which is a veined material located in the earth, a second electrode electrically connected to the surface of the earth and disposed in a hole which extends from the surface of the earth into the first electrode, an electrolyte disposed in the hole and in contact with the first and second electrodes, and means for electrically connecting the first electrode to the surface of the earth. A seam of coal is preferred as the first electrode. A method of mining metals located in the earth using the earth battery and a method of drilling holes in the earth are also disclosed.

21 Claims, 6 Drawing Figures

EARTH BATTERY

DESCRIPTION

1. Field of the Invention

This invention pertains to earth batteries or electric wells and, more particularly, to a battery in which one electrode is a veined material located in the earth.

2. Background Art

Batteries which convert the chemical energy contained in their active materials directly into electrical energy by means of an oxidation-reduction electrochemical reaction are well-known in the art. Such batteries, in their most basic sense, include a pair of spaced apart electrodes and an electrolyte in the space between the electrodes. During the electrochemical reaction electrons are transferred from one electrode to the other and produce an electrical current when an external circuit is connected between the electrodes.

The electrode which gives up electrons during the reaction, and is oxidized in the process, is referred to as the anode. The other electrode, which is capable of accepting electrons and is an oxidizing material for the overall process, is referred to as the cathode. The electrolyte, generally an aqueous solution, provides the necessary internal ionic conductivity for the flow of electrons released at the anode. The electrolyte may also be a solid material.

The anode, cathode and the electrolyte may be made of a variety of materials, as is well known in the art. The only requirement for the anode and cathode is that one material must give up electrons at a faster rate than the other material, and thereby acquire a positive charge with respect to the other material. In one common battery arrangement, one electrode is made of carbon or copper, the other electrode is made of zinc and the electrolyte is sulphuric acid ($H_2SO_4$).

Various arrangements of these batteries, and the various combinations of materials which may be used for the electrodes and the electrolyte is discussed in Fink, *Standard Handbook for Electrical Engineers,* Eleventh Ed. 1978, pages 11-92 to 11-141, and is incorporated herein by reference.

It is also known in the art to use the earth as an electrolyte in a battery. Typically, two spaced electrodes are buried in the ground, and the ground, by itself or moistened with a chemical, functions as the electrolyte. See U.S. Pat. Nos. 155,209; 160,152; 182,802; 211,322; 329,724; 495,582; and 728,381. In the process disclosed in U.S. Pat. No. 3,278,335, an oil bearing formation forms a portion of an electrolyte and electrical energy is produced through the growth of bacteria in the formation. However, in each of these prior art patents, the electrodes are the typical zinc, carbon or copper plates or rods which are inserted into the earth, and the earth is used solely as an electrolyte.

It is an object of the present invention to provide a battery in which a portion of the earth is one electrode thereof.

It is a further object of the present invention to provide a battery in which one electrode is a veined material in the earth.

Another object of the present invention is to provide such a battery which is capable of generating electricity as well as capable of storing electrical energy.

It is yet a further object of the present invention to utilize such a battery in the mining of veined materials located in the earth.

SUMMARY OF THE INVENTION

Therefore, I have invented an electric battery which includes a first and second spaced electrode and an electrolyte in the space between the electrodes and in contact therewith, in which the first of the electrodes is a veined material located in the earth. In one embodiment, the second electrode is disposed in a hole which extends from the surface of the earth into the first electrode and is electrically connected to the surface of the earth, an electrolyte is disposed in the hole and in contact with the electrodes, and the first electrode is electrically connected to the surface of the earth. The battery may also include a casing disposed within the hole and surrounding the second electrode, such that the casing contains the electrolyte and permits contact of the electrolyte only with the first electrode but not with the surrounding earth. The first electrode is electrically connected to the earth's surface by way of one or more cables anchored thereto and located either within the hole or outside of the hole. The gases generated during the battery operation may be recovered and used as desired.

The first electrode is preferably a veined material located in the earth and may be a seam or vein of coal, graphite, magnetite, nickeline, sphalerite, arsenic, siderite, gold, silver, or copper.

I have also invented a method of mining metals located in the earth using the earth battery of the present invention. The method includes the steps of drilling a hole from the earth's surface into the metal to be mined, placing an electrolyte in the hole and in contact with the metal, positioning a recovery electrode within the hole and at least partially immersed in the electrolyte, making electrical contact with the metal, passing an electric current through the metal, electrolyte and recovery electrode such that the metal will be deposited on the recovery electrode, and removing the deposited metal from the recovery electrode.

I have also invented a method of drilling holes in the earth using the present invention. The method includes the steps of predrilling a small hole into the earth for a desired distance, placing a quantity of acid into the small hole such that the acid will seep into and soften the area around the small hole, and then drilling a hole through the area softened by the acid. The acid may be neutralized prior to the final drilling step.

DETAILED DESCRIPTION OF THE PREFERRED EMBODIMENTS

Figure 1:
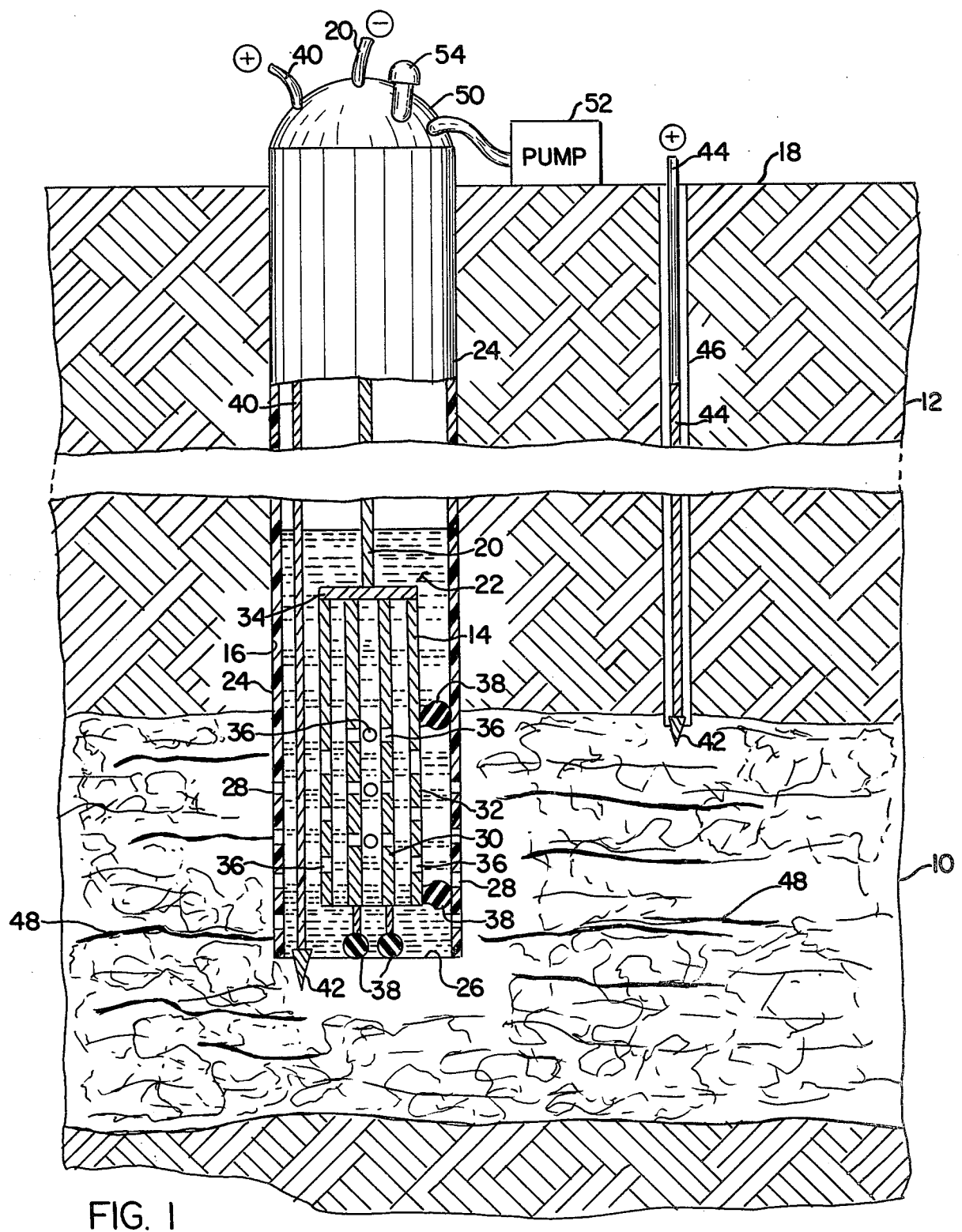
FIG. 1 is a partial cross section taken through the earth and through one embodiment of an earth battery in accordance with the present invention.

An earth battery in accordance with the present invention is shown, partially in cross section, in FIG. 1. The earth battery includes a first electrode 10 which is a veined material located within the earth 12. A second electrode 14 is disposed within a hole 16 which extends from the surface 18 of the earth 12 and into the first electrode 10. The second electrode 14 is electrically connected to the surface 18 of the earth 12 via cable 20. An electrolyte 22 is disposed in the hole 16, is in contact with the first electrode 10 and the second electrode 14, and fills the space in the hole 16 therebetween. The electrolyte 22 is shown in FIG. 1 as a fluid, but it is to be understood that a solid electrolyte may also be utilized.

The earth battery shown in FIG. 1 also includes a casing 24 disposed within the hole 16, adjacent the earth 12 and the first electrode 10 and surrounding the second electrode 14. The casing 24 is preferably a hollow tube made of plastic or other insulating material and is adapted to prevent the electrolyte 22 from seeping out into the surrounding earth 12. As shown in FIG. 1, the casing extends from the earth's surface 18 to the bottom 26 of the hole 16, but does not cover said bottom 26. The casing 24 includes a plurality of openings 28 in the area where the casing is adjacent the first electrode 10. These openings 28 permit the electrolyte 22 to contact and flow into the first electrode 10 but not into the surrounding earth 12. The hole 16 and the casing 24 are preferably of circular cross section.

The second electrode 14 may be constructed in a variety of shapes. As shown in FIG. 1, the second electrode 14 includes inner and outer cylindrical sleeves 30, 32 mounted to a top plate 34. A plurality of openings 36 through the sleeves 30, 32 permit the electrolyte 22 to flow completely around all the surfaces of the second electrode 14. In order to prevent the second electrode from touching the first electrode 10 or the casing 24, and thereby shorting out the entire battery, insulating spacers 38 may be mounted on the sides or on the bottom of the second electrode 14.

The first electrode 10 is electrically connected to the surface 18 of the earth 12 by means of a cable which extends into the earth and is physically anchored to the first electrode. As shown in FIG. 1, cable 40 may be located within hole 16 and anchored to the bottom 26 of the hole by a spike 42 or the like. Alternatively, cable 44 may be located outside of hole 16 in a smaller hole 46 which passes into the first electrode 10. Cable 44 is similarly anchored with spike 42. A plurality of cables, spaced around or within the hole 16, may also be used.

The electrolyte 22 will seep into and cause stress fractures 48 in the first electrode 10. Cable 44 located outside of hole 16 is preferably anchored within the extent of the electrolyte 22 seepage. Over a period of time, the area of electrolyte seepage, and hence the effective size of the first electrode 10 in the battery, will slowly increase. It can be appreciated that the earth battery of the present invention can be permitted to grow as large as desired by allowing the electrolyte 22 to continue to seep into the first electrode 10. The casing 24 is preferably sealed at the top by a lid 50 or the like. The rate of seepage of the electrolyte 22 into the first electrode may be regulated by a vacuum pump 52 connected to the inside of the casing 24.

Various gases will be generated by the earth battery, both from the electrochemical reaction involved in the battery itself and the gases released from the first electrode 10 as the stress fractures 48 are formed. For example, if the first electrode 10 is a seam of coal, methane will be released, and if the second electrode is made of zinc and the electrolyte is sulphuric acid, oxygen and hydrogen will be generated during the electrochemical reaction of the battery. The casing lid 50 may include a pressure relief valve 54 to release these generated gases built up in the casing 24 when the pressure exceeds a predetermined value.

The earth battery described above operates in the exact same manner as a conventional battery and generates electrical energy from the electrochemical reaction of the electrodes and the electrolyte. The first electrode 10 is selected to be a veined material located in the earth and may include seams or layers of such materials as coal, graphite, magnetite, nickeline, sphalerite, arsenic, siderite, gold, silver and copper. The second electrode is selected from a material suitable for use with the particular veined material used as is well known in the art. A suitable electrolyte is selected to function with the electrodes chosen as is well known in the art.

In a preferred embodiment, a seam of coal is used as the first electrode, the second electrode is made of zinc, and sulphuric acid is used as the electrolyte. As an alternative, pickling acid, which is usually a waste by-product of a metal manufacturing plant, can be utilized as the electrolyte. Furthermore, a solid electrolyte, such as ammonium chloride ($NH_4Cl$) or zinc chloride ($ZnCl$) may be used. The use of an acidic electrolyte should not cause any environmental problems if the seam of coal, or other veined material, is located beneath the surrounding water table level. If pollution of the water table is of concern, an alkaline electrolyte, such as potassium hydroxide, may be used.

The earth battery described above may be used as a source of electrical energy at a variety of locations which have underground veins of suitable electrode material. The earth battery has the advantages that it is located primarily underground and out of the way, the functioning portions remain at a constant temperature, and the battery has the potential of growing to a rather large size. The battery of the present invention may be used as an electrical energy source, but may also be used to store electrical energy from a variety of sources such as solar cells, windmills, lightning, or the excess capacity from electrical utility plants.

Figure 2:
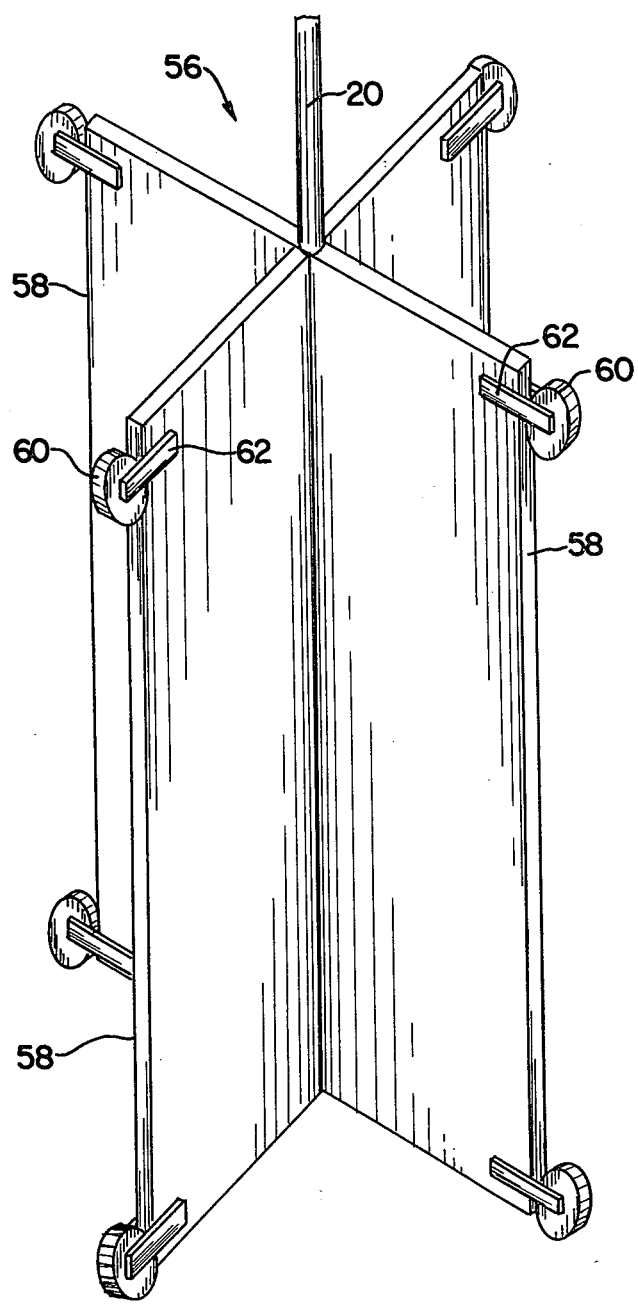
FIG. 2 is a perspective view of one embodiment of the second electrode.

An alternate embodiment of a second electrode 56 is shown in FIG. 2 and includes four rectangular plates 58 joined together along one edge to form an X-shaped structure. While only four plates 58 are shown in FIG. 2, more or fewer plates may be utilized as desired. Second electrode 56 also includes a plurality of glass wheels 60, each of which are mounted to the plates 58 by a bracket 62. The glass wheels 60 are insulating and function to support and space second electrode 56 from the casing and the first electrode in a similar manner to the spacers 38 discussed above in connection with FIG. 1.

Figure 3:
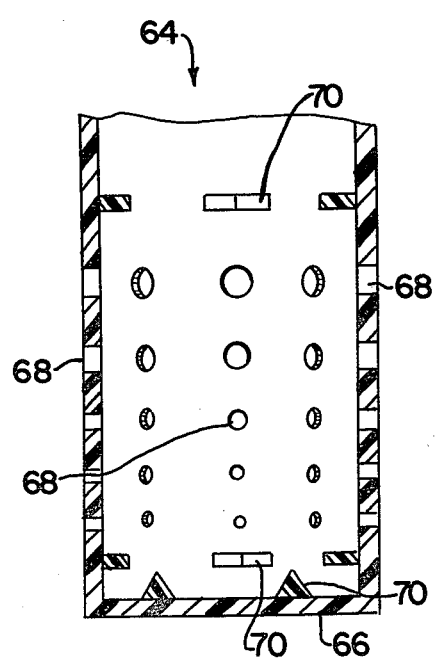
FIG. 3 is a cross section of the bottom portion of one embodiment of the casing.

An alternate arrangement for the casing is shown in FIG. 3. Casing 64 shown in FIG. 3 is similar to casing 24 discussed above but further includes a bottom casing plate 66 which seals casing 64 and prevents the electrolyte from flowing downwardly. Openings 68 in casing 64 vary in size inversely with distance of each opening from the surface of the earth. The smallest opening is located nearest the bottom plate 66 and openings 68 gradually increase in size as the distance from the bottom plate increases. Since the pressure of the electrolyte fluid increases toward the bottom plate 66 from the weight of the fluid above, the rate of flow of the electrolyte through openings 68 and into the first electrode will remain constant.

A plurality of sharp protrusions 70 are located along the inner surface of casing 64 near openings 68 and on the bottom plate 66. When the earth battery of the present invention is no longer in use, it may be desirable to neutralize the acidic electrolyte liquid used. Baking soda, or any other acid neutralizing substance, may be placed into a glass or other breakable container and dropped into the casing. The breakable container will strike the sharp protrusions 70, break apart, and release the acid neutralizing substance into the electrolyte.

Figure 4:
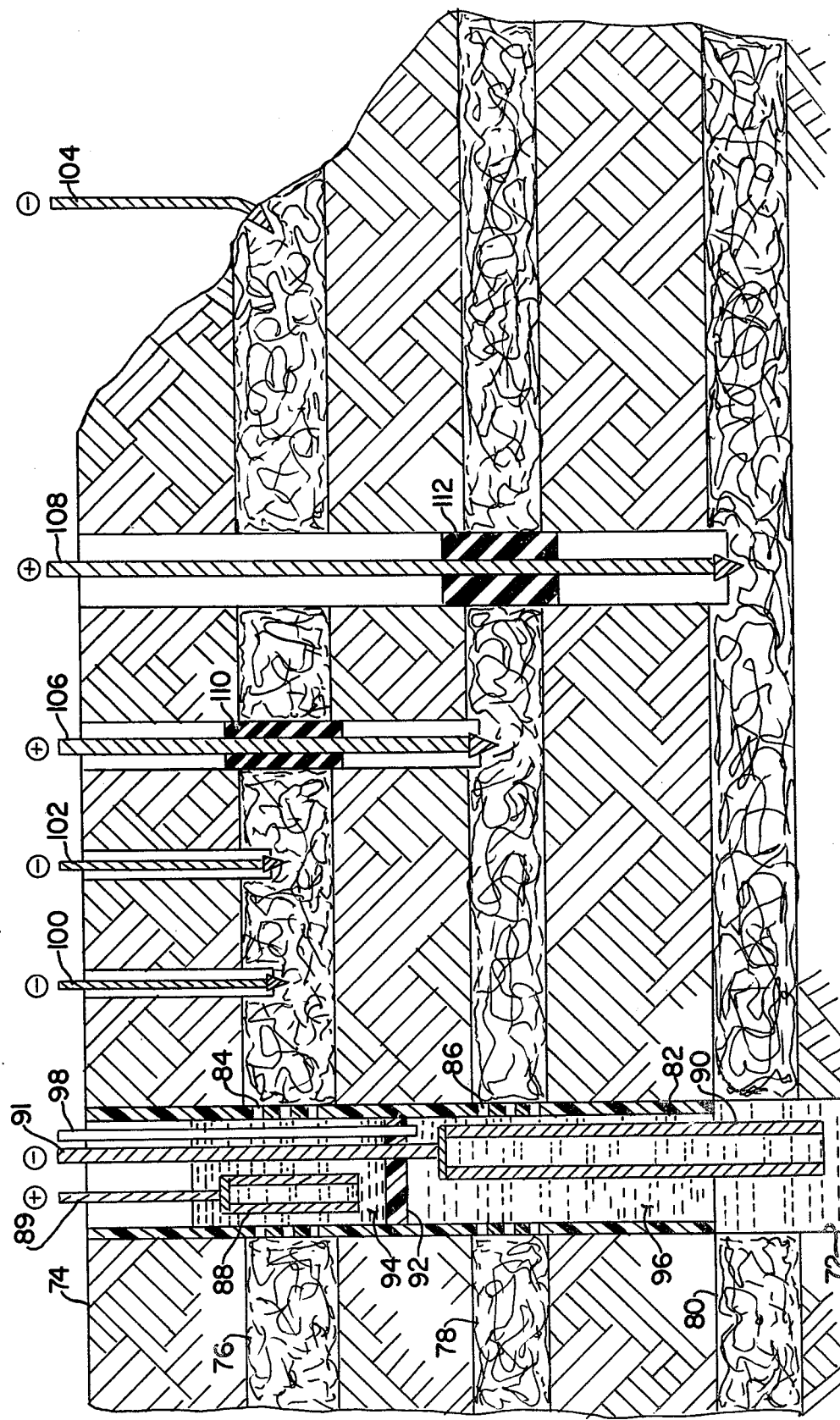
FIG. 4 is a cross section taken through the earth showing several alternative arrangements of the earth battery.

The earth battery of the present invention may utilize more than one veined material in the earth as electrodes and the materials may be the same or may be different from each other. In the configuration shown in FIG. 4, hole 72 passes from the earth's surface 74 through three veins of material, referred to as first electrode 76, first electrode 78 and first electrode 80. Casing 82 is disposed within hole 72 and extends to the top of first electrode 80. Openings 84 extend through casing 82 into first electrode 78 and openings 86 extend through casing 82 into first electrode 78. Second electrode 88 is disposed within casing 82 adjacent first electrode 76 and is connected to the earth's surface 74 via cable 89. Second electrode 90 is disposed within casing 82 adjacent both first electrode 78 and first electrode 80 and is connected to the earth's surface 74 via cable 91. As shown in FIG. 4, second electrode 90 is a single electrode which reacts electrochemically with both first electrode 78 and first electrode 80.

In the arrangement shown in FIG. 4, first electrode 76 is a negative material with respect to both first electrode 78 and first electrode 80. To prevent a shorting out of the earth battery, the interior of casing 82 is divided by a plug 92. In this manner, one earth battery is formed by first electrode 76, second electrode 88, and electrolyte 94, and a second, separate earth battery is formed by first electrode 78, first electrode 80, second electrode 90, and electrolyte 96. To replenish the supply of electrolyte 96, a pipe 98 extends from the earth's surface 74 through the plug 92.

Since hole 72 passes completely through first electrode 76 and first electrode 78, electrical connection between these electrodes and the earth's surface 74 cannot be made within hole 72. Cables 100 and 102 extend down and are attached to first electrode 76. While only two cables 100 and 102 are shown, it is to be understood that fewer or more cables may be attached to one such electrode. As shown in FIG. 4, first electrode 76 is exposed to the earth's surface, such as on a hill, and may be electrically contacted directly by cable 104 without the necessity of passing through the earth. First electrode 78 is electrically connected to the earth's surface by cable 106 and first electrode 80 is electrically connected to the earth's surface by cable 108. To avoid short circuits, the cables should not electrically contact the other veins of material through which they pass. Cable 106 is shown surrounded by heavy insulation 110 in the vicinity of first electrode 76. Cable 108 is shown physically spaced from first electrode 76 and surrounded by heavy insulation 112 in the vicinity of first electrode 78. Ideally, the entire length of each cable would be encased in an insulating material, except where electrical contact is made at the ends.

The relative electrical potential of each electrode shown in FIG. 4 is shown as being either positive or negative. The various electrodes could be operated as separate batteries, or could be connected in parallel or in series as is desired.

As an example of the arrangement shown in FIG. 4, first electrodes 78 and 80 could each be a seam of coal, which is considered to be a relatively positive material. Second electrode 90 may be made of zinc, a negative material when compared with coal. First electrode 76 may be a seam of magnetite ($Fe_3S_4$), nickeline (NiAs), or sphalerite (ZnS), each considered to be a negative material. Second electrode 88 may be made of carbon, a positive material when compared with the magnetite, nickeline or sphalerite. The particular arrangement used will be dictated solely by the various veined materials actually encountered within the earth.

Figure 5:
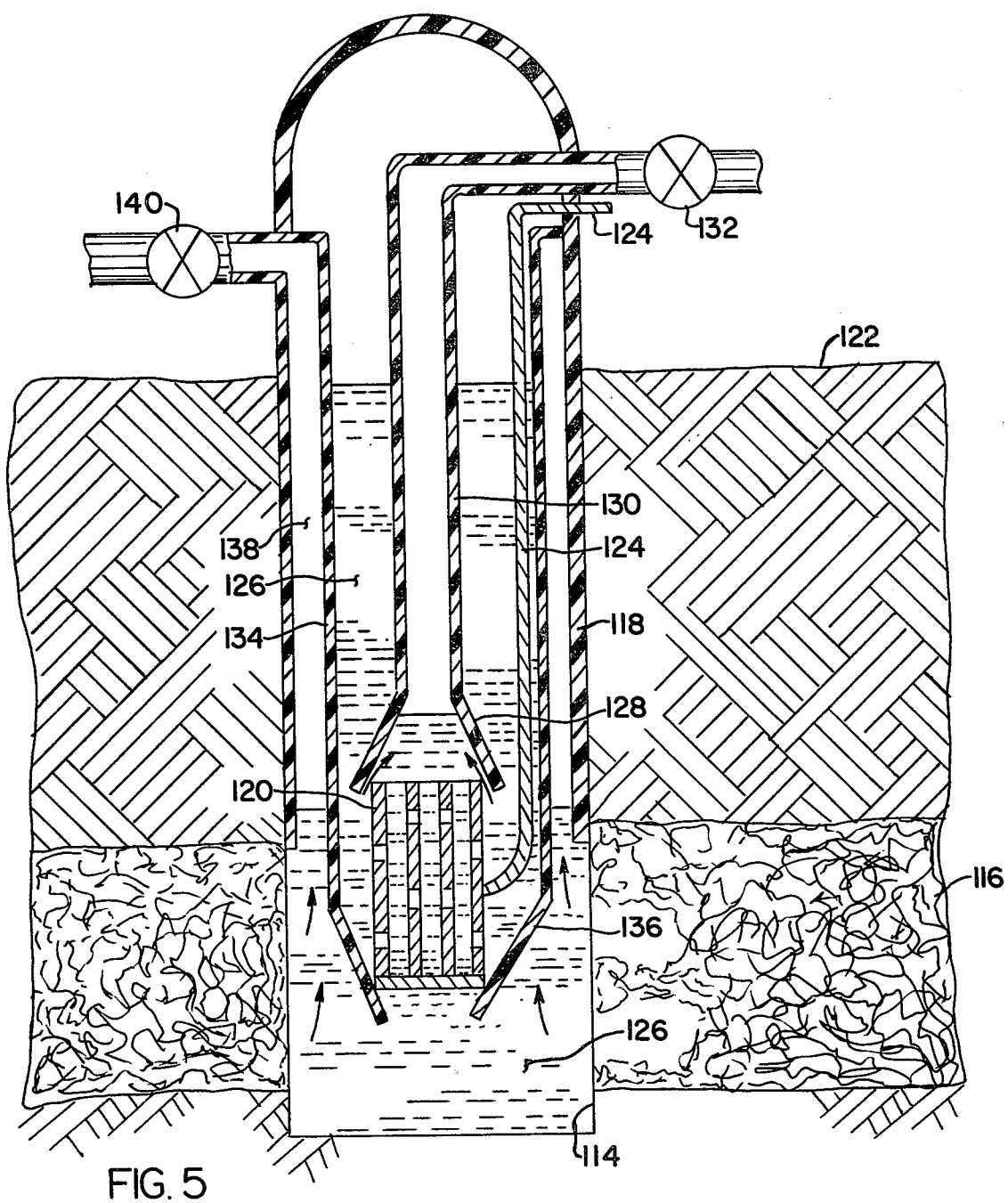
FIG. 5 is a cross section taken through the earth showing one embodiment of a gas recovery mechanism for the earth battery.

An arrangement of an earth battery of the present invention which includes apparatus for collecting the gases generated during battery operation is shown in FIG. 5. The earth battery includes hole 114, passing through first electrode 116, and casing 118 which extends adjacent hole 114 as described above. Second electrode 120 is identical to the second electrode 14 shown in FIG. 1, except that it is turned upside down, and is electrically connected to the earth's surface 122 by cable 124. Electrolyte 126 is located in hole 114 between first electrode 116 and second electrode 120.

A funnel-shaped trap 128 is disposed above second electrode 120 to collect the gases generated therein. The trap 128 is connected to pipe 130 which carries the gas through valve 132 and then out of casing 118. Sleeve 134 is disposed within and spaced from casing 118 and terminates near the bottom of hole 114 in an inwardly directed, cone-shaped deflector 136. Deflector 136 is open to allow electrolyte 126 to flow between the interior and exterior of sleeve 134. Gases which are either generated by or are released from first electrode 116 are directed by deflector 136 into the space 138 between sleeve 134 and casing 118, and then out of casing 118 through valve 140.

If valves 132 and 140 were open, the gases generated would continuously escape. If valves 132 and 140 were closed, the pressure of the generated gases would increase, and eventually force electrolyte 126 up into the area between pipe 130 and sleeve 134, as is shown in FIG. 5. When the valves are opened, electrolyte 126 will drop back down to its original level and aid in expelling the generated gases.

The particular gases generated will depend on the exact materials involved. If the first electrode were coal, the second electrode zinc, and the electrolyte sulphuric acid, then oxygen would be generated at the second electrode, hydrogen would be generated at the first electrode, and methane would be released from the first electrode due to the fracturing of the coal from the electrolyte. The recovered gases could be used as is or could be burned to generate electric energy.

The earth battery of this invention can also be easily used to recover metals located in the earth. If a metal, such as gold, copper, or silver, is used as the first electrode, and a direct current is passed through the battery, the metal will be removed from the first electrode and plated onto the second electrode. By withdrawing the second electrode from the battery and removing the plated metal, the mining operation is completed.

Figure 6:
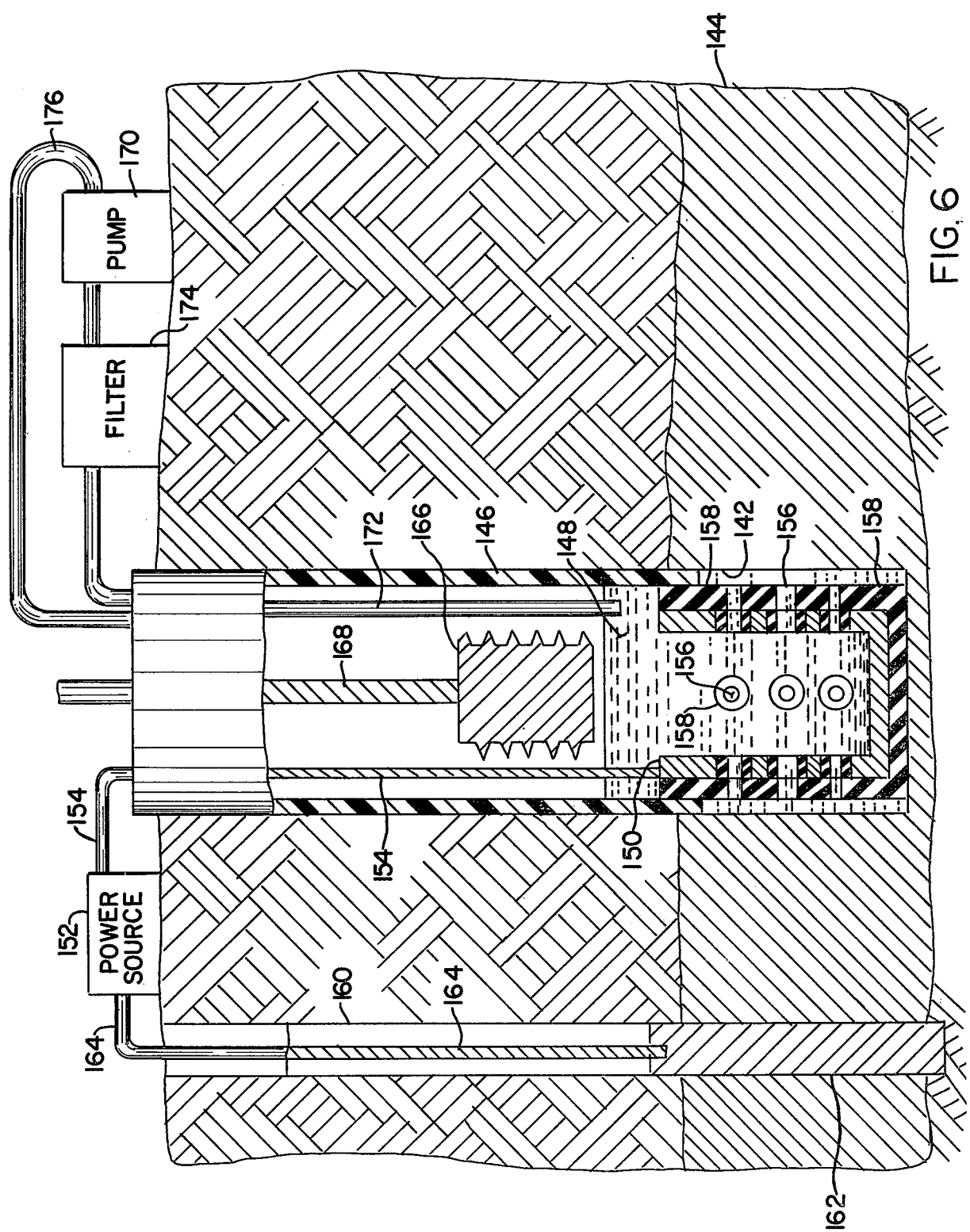
FIG. 6 is a partial cross section taken through the earth showing one embodiment of a metal recovery apparatus in accordance with the present invention.

Any of the earth battery arrangements discussed above could be utilized in the mining of such a metal. FIG. 6 shows an arrangement particularly adapted for mining a vein of metal. Hole 142 extends into the vein of metal 144 to be mined, casing 146 extends down to the top of the vein of metal, and electrolyte 148 is deposited in hole 142. A recovery electrode 150 is placed into hole 142 and is at least partially immersed in electrolyte 148. The recovery electrode 150 is connected to a direct current power source 152 by cable 154.

The recovery electrode 150 shown in FIG. 6 is cup-shaped, open at the top, and includes a plurality of openings 156 passing therethrough. The outside of the recovery electrode 150 and the surface of openings 156 are covered with insulation 158. Only the inner surface of the recovery electrode 150 is in contact with electrolyte 148, and will be plated with the metal 144.

To make electrical connection between the power source 152 and the vein of metal 144, hole 160 is passed through the vein of metal, a liquid, electrically conductive material 162 is poured into hole 160, and cable 164 is connected between the power source 152 and material 162, preferably before liquid material 162 has solidified. By passing a direct current through the vein of metal 144, electrolyte 148 and recovery electrode 150, the metal will be plated on the recovery electrode as is known in the art.

The plated metal may be recovered by withdrawing the recovery electrode 150 from hole 142 and thereafter removing the metal. Alternatively, the metal could be removed with the recovery electrode 150 in place within hole 142. Shown in FIG. 6 is a threaded auger 166 which is as wide as the inner width of the recovery electrode. The auger 166 may be rotated via shaft 168 and lowered into the recovery electrode 150 to thereby scrape off any metal plated thereon. The metal will then be floating in electrolyte 148 in small pieces. By removing electrolyte 148 via pump 170 through an outlet pipe 172, the metal may be recovered by passing electrolyte 148 through a filter 174. The filtered electrolyte may then be returned to the battery via an inlet pipe 176.

This method can be used to recover natural veined metals located in the earth or metals buried in the earth such as gold bars, coins, or the like, which are otherwise inaccessible to conventional mining techniques. This method is particularly useful for mining paper thin seams of gold which cannot be economically mined using conventional mining techniques.

When the earth battery is no longer in use and the casing, second electrode, and other materials are removed from the hole, the ground surrounding the hole will be relatively soft due to the action of the acidic electrolyte. If a larger hole were desired, such as to reach oil deposits beneath the vein of material previously used in the earth battery, such drilling could be accomplished relatively early because the ground is already softened. This method of drilling may be useful in passing a large hole through a particularly hard rock formation. By merely drilling a small hole through the rock formation, pouring in a quantity of an acid solution, and letting the rock be softened by the acid, a larger hole may be easily drilled through the formation. It may be desirable to neutralize the acid remaining in the rock before the final drilling step. This may be done by pouring in an acid neutralizing solution, such as a baking soda solution.

Having described presently the preferred embodiments of this invention, it is to be understood that it may be otherwise embodied within the scope of the appended claims.

I claim:

1. In an electric battery including a pair of spaced electrodes and an electrolyte in the space between the electrodes and in contact therewith, the improvement comprising: one of said electrodes being a solid veined material located in the earth.

2. The battery of claim 1 wherein the veined material is selected from the group consisting of coal, graphite, magnetite, nickeline, sphalerite, arsenic, siderite, gold, silver, or copper.

3. The battery of claim 1 wherein the veined material is a seam of coal.

4. An earth battery comprising:
   (a) a first electrode which is a solid veined material located in the earth;
   (b) a second electrode electrically connected to the surface of the earth and disposed in a hole which extends from the surface of the earth into the first electrode;
   (c) an electrolyte disposed in said hole and in contact with said first and second electrodes, and
   (d) means for electrically connecting said first electrode to the surface of the earth.

5. The earth battery of claim 4 further including a casing disposed within the hole and surrounding the second electrode, wherein said casing contains the electrolyte and permits contact of the electrolyte with the first electrode but not with the surrounding earth.

6. The earth battery of claim 5 wherein the casing is a plastic tube which includes a plurality of openings in the area where the tube is adjacent the first electrode.

7. The earth battery of claim 6 wherein the electrolyte is fluid and wherein the openings vary in size inversely with their distance from the surface of the earth, such that the flow of electrolyte into the first electrode is at a uniform rate.

8. The earth battery of claim 4 wherein the means for electrically connecting the first electrode to the surface of the earth is a cable anchored to the first electrode.

9. The earth battery of claim 8 wherein the cable is anchored to the first electrode inside of said hole.

10. The earth battery of claim 8 wherein the cable is anchored to the first electrode outside of said hole.

11. The earth battery of claim 4 wherein the means for electrically connecting the first electrode to the surface of the earth is a plurality of cables anchored to the first electrode.

12. The earth battery of claim 11 wherein said plurality of cables are located outside of said hole.

13. The earth battery of claim 4 wherein the first electrode further includes one or more additional and separate veins of material located in the earth.

14. The earth battery of claim 4 further including means for recovering the gases generated during use of the battery.

15. The earth battery of claim 14 wherein the means for recovering gases includes a funnel-shaped trap located above the second electrode to collect the gases generated by the second electrode and wherein the means for recovering gases further includes a sleeve disposed within but narrower than the hole and adapted to direct the gases released by the first electrode into the space between the hole and the sleeve.

16. The earth battery of claim 4 further including a regulating means for controlling the flow of electrolyte into the first electrode.

17. The earth battery of claim 16 wherein the regulating means is a vacuum pump.

18. The earth battery of claim 4 wherein the first electrode is a vein of material selected from the group consisting of coal, graphite magnetite, nickeline, sphalerite, arsenic, siderite, gold, silver, or copper.

19. The earth battery of claim 18 wherein the first electrode is a seam of coal.

20. An earth battery comprising:
(a) a vein of coal located in the earth;
(b) an electrode disposed in a hole which extends through the vein of coal;
(c) a liquid electrolyte located in the space between the coal and the electrode;
(d) a casing disposed within the hole and surrounding the electrode, said casing directing the liquid electrolyte into the coal; and
(e) an electric cable anchored to the coal and extending to the earth's surface.

21. The earth battery of claim 20 wherein the electrode disposed in the hole is made of zinc and the electrolyte is an acid solution.

* * * * *